US012812132B2

(12) United States Patent
Tsai et al.

(10) Patent No.: US 12,812,132 B2
(45) Date of Patent: Nov. 24, 2026

(54) METHODS AND APPARATUS FOR IMPLICIT SUB-BLOCK TRANSFORM CODING

(71) Applicant: MEDIATEK INC., Hsinchu City (TW)

(72) Inventors: Chia-Ming Tsai, Hsinchu City (TW); Chih-Wei Hsu, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 9 days.

(21) Appl. No.: 18/876,329

(22) PCT Filed: Jun. 21, 2023

(86) PCT No.: PCT/CN2023/101842

§ 371 (c)(1),
(2) Date: Dec. 18, 2024

(87) PCT Pub. No.: WO2023/246901

PCT Pub. Date: Dec. 28, 2023

(65) Prior Publication Data

US 2025/0373819 A1 Dec. 4, 2025

Related U.S. Application Data

(60) Provisional application No. 63/354,380, filed on Jun. 22, 2022, provisional application No. 63/354,376, filed on Jun. 22, 2022.

(51) Int. Cl.
*H04N 19/176* (2014.01)
*H04N 19/167* (2014.01)

(52) U.S. Cl.
CPC ......... *H04N 19/176* (2014.11); *H04N 19/167* (2014.11)

(58) Field of Classification Search
CPC ........................... H04N 19/176; H04N 19/167
See application file for complete search history.

(56) References Cited

U.S. PATENT DOCUMENTS 11,297,348 B2 4/2022 Chiang
2019/0320203 A1 10/2019 Chiang
(Continued)

FOREIGN PATENT DOCUMENTS

CN 112042187 A 12/2020
WO 2020251420 A2 12/2020
WO 2021108676 A1 6/2021

OTHER PUBLICATIONS

International Search Report and Written Opinion dated Sep. 21, 2023, issued in application No. PCT/CN2023/101842.
(Continued)

*Primary Examiner* — Francis Geroleo
(74) *Attorney, Agent, or Firm* — McClure, Qualey & Rodack, LLP

(57) ABSTRACT

Methods for implicitly deriving SBT position. According to this method, for a decoder side, an SBT position is determined among a set of candidate sub-part blocks for the current block, where the SBT position is determined implicitly without parsing the SBT position from a bitstream or the SBT position is selected from a partial set of candidate sub-part blocks derived implicitly from the set of candidate sub-part blocks. Transformed residual data are derived for the current block from the encoded data associated with the current block. SBT is applied to the transformed residual data for the current block, by using SBT information comprising the SBT position, to recover reconstructed residual data for the current block. A corresponding method for the encoder side is also disclosed.

13 Claims, 9 Drawing Sheets

(56) References Cited

U.S. PATENT DOCUMENTS

| | | | | |
|---|---|---|---|---|
| 2020/0288130 | A1* | 9/2020 | Seregin | H04N 19/625 |
| 2021/0084321 | A1* | 3/2021 | Sarwer | H04N 19/60 |
| 2022/0030240 | A1* | 1/2022 | Liu | H04N 19/70 |
| 2023/0050468 | A1* | 2/2023 | Wang | H04N 19/157 |
| 2023/0104359 | A1* | 4/2023 | Wang | H04N 19/176<br>375/240.25 |

OTHER PUBLICATIONS

Chen, J., et al.; "Algorithm description for Versatile Video Coding and Test Model 5 (VTM 5);" Joint Video Experts Team (JVET) of ITU-T SG 16 WP 3 and ISO/IEC JTC 1/SC 29/WG 11; Mar. 2019; pp. 1-79.

* cited by examiner

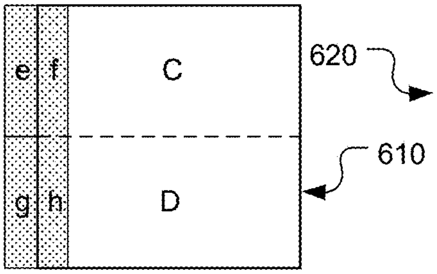
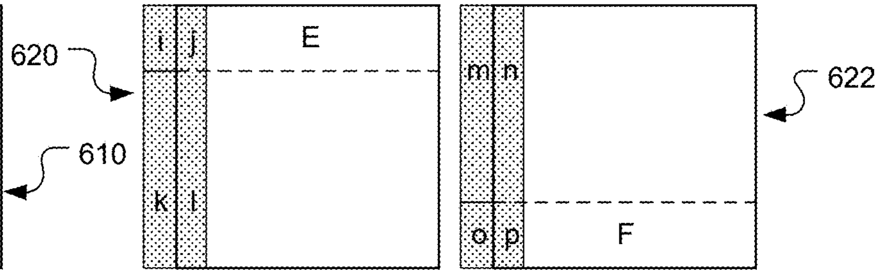
Fig. 6A
Fig. 6B
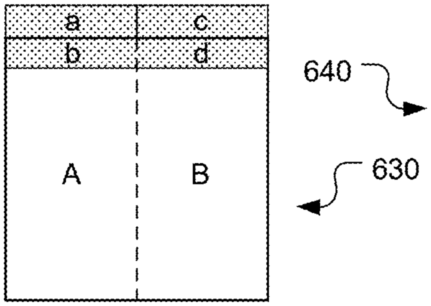
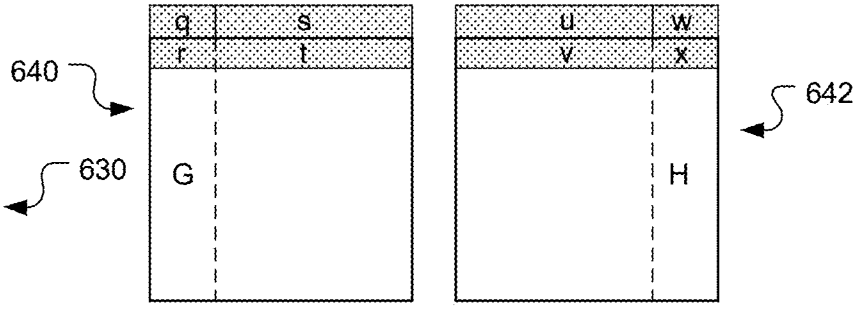
Fig. 6C
Fig. 6D
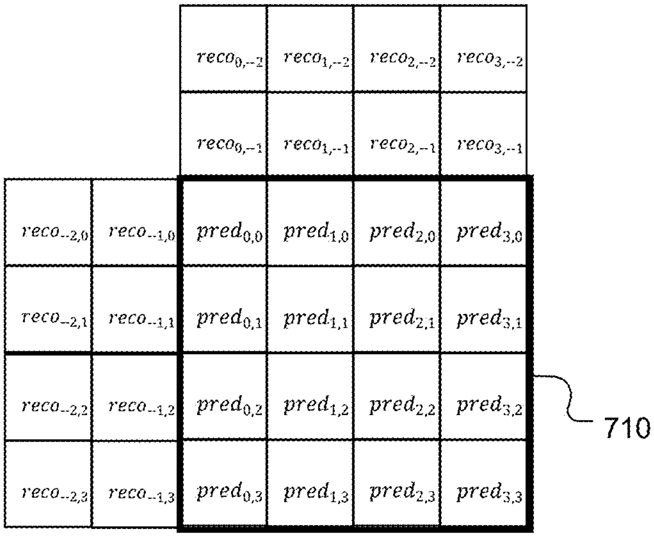
Fig. 7

METHODS AND APPARATUS FOR IMPLICIT SUB-BLOCK TRANSFORM CODING

CROSS REFERENCE TO RELATED APPLICATIONS

The present invention is a non-Provisional Application of and claims priority to U.S. Provisional Patent Application No. 63/354,376, filed on Jun. 22, 2022 and U.S. Provisional Patent Application No. 63/354,380, filed on Jun. 22, 2022. The U.S. Provisional Patent Applications are hereby incorporated by reference in their entireties.

FIELD OF THE INVENTION

The present invention relates to Sub-Block Transform (SBT) process for inter-prediction coded blocks in a video coding system. In particular, the present invention relates to bit saving by deriving information related to SBT implicitly.

BACKGROUND

Versatile video coding (VVC) is the latest international video coding standard developed by the Joint Video Experts Team (JVET) of the ITU-T Video Coding Experts Group (VCEG) and the ISO/IEC Moving Picture Experts Group (MPEG). The standard has been published as an ISO standard: ISO/IEC 23090-3:2021, Information technology—Coded representation of immersive media-Part 3: Versatile video coding, published February 2021. VVC is developed based on its predecessor HEVC (High Efficiency Video Coding) by adding more coding tools to improve coding efficiency and also to handle various types of video sources including 3-dimensional (3D) video signals.

FIG. 1A illustrates an exemplary adaptive Inter/Intra video coding system incorporating loop processing. For Intra Prediction, the prediction data is derived based on previously coded video data in the current picture. For Inter Prediction 112, Motion Estimation (ME) is performed at the encoder side and Motion Compensation (MC) is performed based of the result of ME to provide prediction data derived from other picture(s) and motion data. Switch 114 selects Intra Prediction 110 or Inter-Prediction 112 and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion and coding modes associated with Intra prediction and Inter prediction, and other information such as parameters associated with loop filters applied to underlying image area. The side information associated with Intra Prediction 110, Inter prediction 112 and in-loop filter 130, are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, in-loop filter 130 is often applied to the reconstructed video data before the reconstructed video data are stored in the Reference Picture Buffer 134 in order to improve video quality. For example, deblocking filter (DF), Sample Adaptive Offset (SAO) and Adaptive Loop Filter (ALF) may be used. The loop filter information may need to be incorporated in the bitstream so that a decoder can properly recover the required information. Therefore, loop filter information is also provided to Entropy Encoder 122 for incorporation into the bitstream. In FIG. 1A, Loop filter 130 is applied to the reconstructed video before the reconstructed samples are stored in the reference picture buffer 134. The system in FIG. 1A is intended to illustrate an exemplary structure of a typical video encoder. It may correspond to the High Efficiency Video Coding (HEVC) system, VP8, VP9, H.264 or VVC.

The decoder, as shown in FIG. 1B, can use similar or portion of the same functional blocks as the encoder except for Transform 118 and Quantization 120 since the decoder only needs Inverse Quantization 124 and Inverse Transform 126. Instead of Entropy Encoder 122, the decoder uses an Entropy Decoder 140 to decode the video bitstream into quantized transform coefficients and needed coding information (e.g. ILPF information, Intra prediction information and Inter prediction information). The Intra prediction 150 at the decoder side does not need to perform the mode search. Instead, the decoder only needs to generate Intra prediction according to Intra prediction information received from the Entropy Decoder 140. Furthermore, for Inter prediction, the decoder only needs to perform motion compensation (MC 152) according to Inter prediction information received from the Entropy Decoder 140 without the need for motion estimation.

In the present invention, methods and apparatus for deriving sub-block transform information implicitly according to the boundary matching cost in order to improve coding efficiency are disclosed.

BRIEF SUMMARY OF THE INVENTION

A method and apparatus for video coding are disclosed. According to the method at the decoder side, encoded data associated with a current block to be decoded are received where the current block is coded using an SBT (Subblock Transform) mode. An SBT position among a set of candidate sub-part blocks for the current block is determined, where the SBT position is determined implicitly without parsing the SBT position from a bitstream or the SBT position is selected from a partial set of candidate sub-part blocks derived implicitly from the set of candidate sub-part blocks. Transformed residual data for the current block are derived from the encoded data associated with the current block. SBT is applied, by using SBT information comprising the SBT position, to the transformed residual data for the current block to recover reconstructed residual data for the current block.

In one embodiment, the SBT position is determined according to boundary matching cost derived from one or more neighbouring samples of the current block and one or more corresponding boundary samples of the current block for the set of candidate sub-part blocks. For example, the boundary matching costs can be derived for the set of candidate sub-part blocks, where one boundary matching cost is determined for each candidate sub-part block based on the differences derived from predicted samples of said one or more corresponding boundary samples of the current block and reconstructed samples of said one or more neighbouring samples of the current block for said each candidate sub-part block. In this case, the SBT position can be determined according to a target candidate sub-part block having a largest boundary matching cost among the boundary matching costs for the set of candidate sub-part blocks.

In one embodiment, the boundary matching costs are derived for the set of candidate sub-part blocks, where one boundary matching cost is determined for each candidate sub-part block based on first differences derived from reconstructed samples of said one or more corresponding boundary samples of the current block and reconstructed samples of said one or more neighbouring samples of the current block for said each candidate sub-part block with residual and second differences derived from the predicted samples of said one or more corresponding boundary samples of the current block and reconstructed samples of said one or more neighbouring samples of the current block for remaining candidate sub-part blocks without residual, the reconstructed samples of said one or more corresponding boundary samples of the current block are generated by adding reconstructed residual samples of the current block to predicted samples of said each candidate sub-part block. In this case, the SBT position is determined according to a target candidate sub-part block having a smallest boundary matching cost among the boundary matching costs for the set of candidate sub-part blocks.

In one embodiment, the neighbouring samples of the current block comprise top neighbouring samples of the current block, left neighbouring samples of the current block, or both.

In one embodiment, the set of candidate sub-part blocks comprises sub-part blocks generated using SBT-V with BT split, SBT-H with BT split, SBT-V with ABT split, SBT-H with ABT split, SBT-V with TT split, SBT-H with TT split, or a combination thereof.

In one embodiment, an SBT partition direction is implicitly determined. For example, the SBT partition direction can be implicitly determined by comparing boundary matching costs associated with hypothetical positions resulted from flipping, rotating, or clipping/pasting contents of residual block of the current block.

In one embodiment, an SBT partition type is implicitly determined.

In one embodiment, the partial set of candidate sub-part blocks correspond to first k hypothetical positions with largest boundary matching costs among N hypothetical positions of the set of candidate sub-part blocks, and wherein k and N are positive integers with N greater than k. Furthermore, an index can be parsed from the bitstream, and wherein the index indicates the SBT position among the first k hypothetical positions.

A corresponding method for the encoder side is also disclosed. At the decoder side, pixel data associated with a current block to be encoded are received, where the current block is coded using an SBT (Subblock Transform) mode. Residual data for the current block are derived by applying inter prediction to the current block. An SBT position is determined among a set of candidate sub-part blocks for the current block, where the SBT position is determined implicitly without signalling the SBT position in a bitstream or the SBT position is selected from a partial set of candidate sub-part blocks derived implicitly from the set of candidate sub-part blocks. SBT is applied to the residual data for the current block, by using SBT information comprising the SBT position, to generate transformed residual data for the current block.

BRIEF DESCRIPTION OF THE DRAWINGS

FIGS. 6A-D illustrate an examples of the regions used for boundary matching calculation for different SBTs according to one embodiment of the present invention.

FIG. 7 illustrates examples of samples involved in boundary matching cost calculation according to one embodiment of the present invention.

DETAILED DESCRIPTION OF THE INVENTION

Figure 1A:
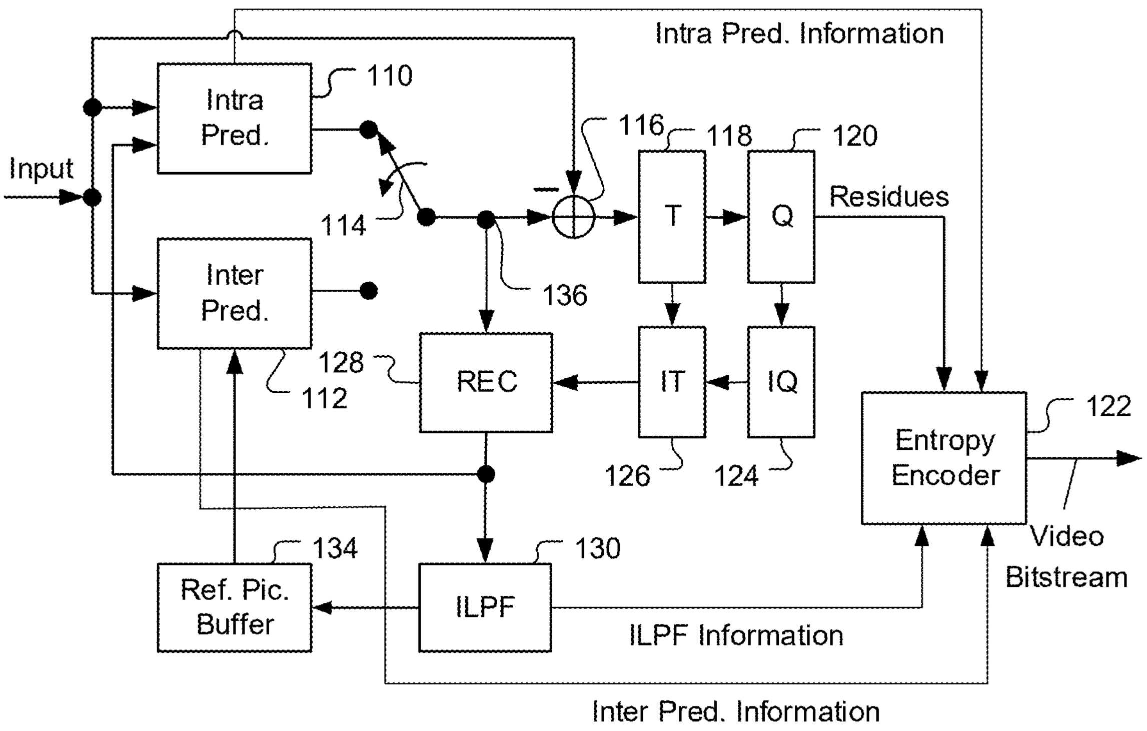
FIG. 1A illustrates an exemplary adaptive Inter/Intra video coding system incorporating loop processing.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. References throughout this specification to "one embodiment," "an embodiment," or similar language mean that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

According to VVC, an input picture is partitioned into non-overlapped square block regions referred as CTUs (Coding Tree Units), similar to HEVC. Each CTU can be partitioned into one or multiple smaller size coding units (CUs). The resulting CU partitions can be in square or rectangular shapes. Also, VVC divides a CTU into prediction units (PUs) as a unit to apply prediction process, such as Inter prediction, Intra prediction, etc.

The VVC standard incorporates various new coding tools to further improve the coding efficiency over the HEVC standard. Among various new coding tools, some coding tools relevant to the present invention are reviewed as follows.

Partitioning of the CTUs Using a Tree Structure

In HEVC, a CTU is split into CUs by using a quaternary-tree (QT) structure denoted as coding tree to adapt to various local characteristics. The decision whether to code a picture area using inter-picture (temporal) or intra-picture (spatial) prediction is made at the leaf CU level. Each leaf CU can be further split into one, two or four Pus according to the PU splitting type. Inside one PU, the same prediction process is applied and the relevant information is transmitted to the decoder on a PU basis. After obtaining the residual block by applying the prediction process based on the PU splitting type, a leaf CU can be partitioned into transform units (TUs) according to another quaternary-tree structure similar to the coding tree for the CU. One of key feature of the HEVC structure is that it has the multiple partition conceptions including CU, PU, and TU.

Figure 2:
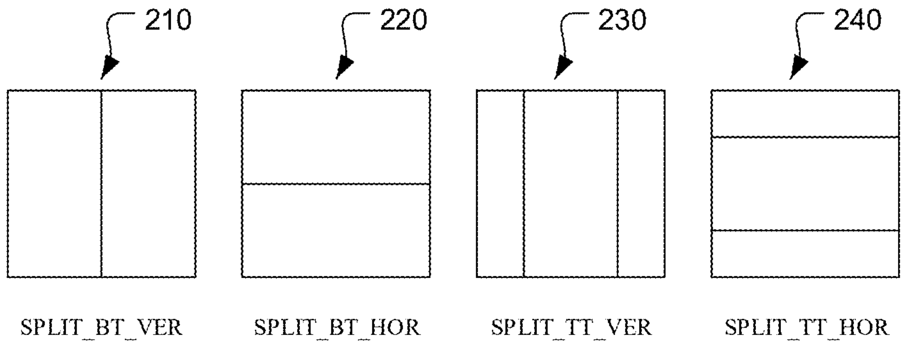
FIG. 2 illustrates examples of a multi-type tree structure corresponding to vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR).

In VVC, a quadtree with nested multi-type tree using binary and ternary splits segmentation structure replaces the concepts of multiple partition unit types, i.e. it removes the separation of the CU, PU and TU concepts except as needed for CUs that have a size too large for the maximum transform length, and supports more flexibility for CU partition shapes. In the coding tree structure, a CU can have either a square or rectangular shape. A coding tree unit (CTU) is first partitioned by a quaternary tree (a.k.a. quadtree) structure. Then the quaternary tree leaf nodes can be further partitioned by a multi-type tree structure. As shown in FIG. 2, there are four splitting types in multi-type tree structure, vertical binary splitting (SPLIT_BT_VER 210), horizontal binary splitting (SPLIT_BT_HOR 220), vertical ternary splitting (SPLIT_TT_VER 230), and horizontal ternary splitting (SPLIT_TT_HOR 240). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quadtree with nested multi-type tree coding block structure. The exception occurs when maximum supported transform length is smaller than the width or height of the colour component of the CU.

Figure 3:
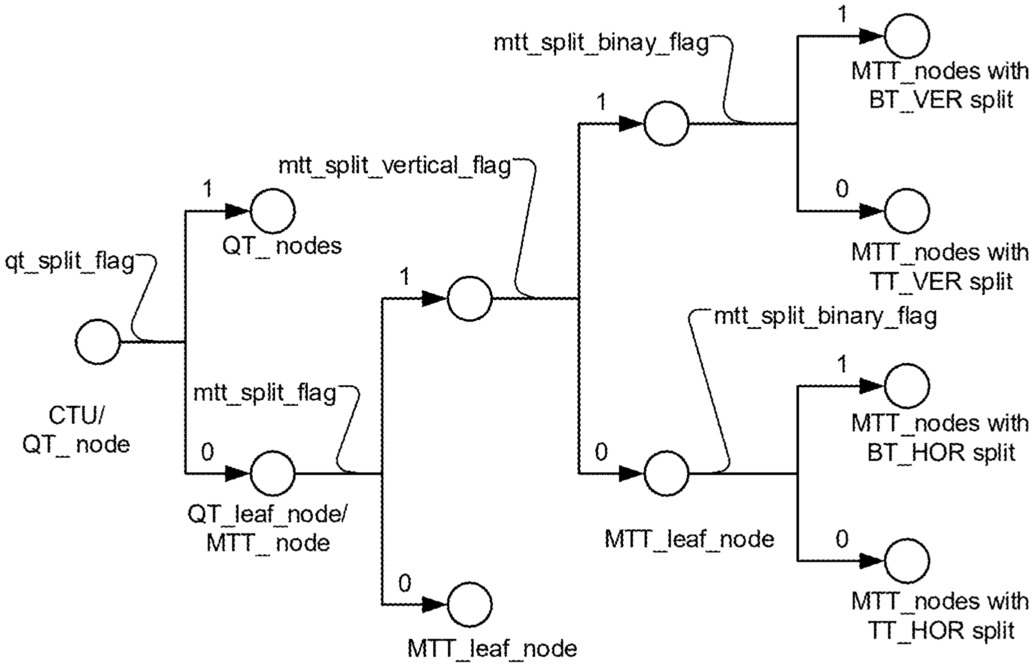
FIG. 3 illustrates an example of the signalling mechanism of the partition splitting information in quadtree with nested multi-type tree coding tree structure.

FIG. 3 illustrates the signalling mechanism of the partition splitting information in quadtree with nested multi-type tree coding tree structure. A coding tree unit (CTU) is treated as the root of a quaternary tree and is first partitioned by a quaternary tree structure. Each quaternary tree leaf node (when sufficiently large to allow it) is then further partitioned by a multi-type tree structure. In the multi-type tree structure, a first flag (mtt_split_cu_flag) is signalled to indicate whether the node is further partitioned; when a node is further partitioned, a second flag (mtt_split_cu_vertical_flag) is signalled to indicate the splitting direction, and then a third flag (mtt_split_cu_binary_flag) is signalled to indicate whether the split is a binary split or a ternary split. Based on the values of mtt_split_cu_vertical_flag and mtt_split_cu_binary_flag, the multi-type tree slitting mode (MttSplitMode) of a CU is derived as shown in Table 1.

TABLE 1

MttSplitMode derviation based on multi-type tree syntax elements

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

Figure 4:
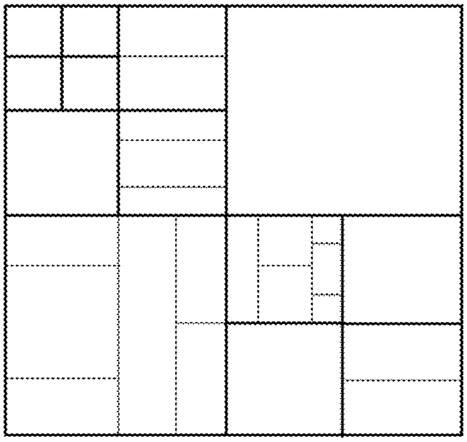
FIG. 4 shows an example of a CTU divided into multiple CUs with a quadtree and nested multi-type tree coding block structure, where the bold block edges represent quadtree partitioning and the remaining edges represent multi-type tree partitioning.

FIG. 4 shows a CTU divided into multiple CUs with a quadtree and nested multi-type tree coding block structure, where the bold block edges represent quadtree partitioning and the remaining edges represent multi-type tree partitioning. The quadtree with nested multi-type tree partition provides a content-adaptive coding tree structure comprised of CUs. The size of the CU may be as large as the CTU or as small as 4×4 in units of luma samples. For the case of the 4:2:0 chroma format, the maximum chroma CB size is 64×64 and the minimum size chroma CB consist of 16 chroma samples.

In VVC, the maximum supported luma transform size is 64×64 and the maximum supported chroma transform size is 32×32. When the width or height of the CB is larger the maximum transform width or height, the CB is automatically split in the horizontal and/or vertical direction to meet the transform size restriction in that direction.

The following parameters are defined and specified by SPS (Sequence Parameter Set) syntax elements for the quadtree with nested multi-type tree coding tree scheme.

CTU size: the root node size of a quaternary tree

MinQTSize: the minimum allowed quaternary tree leaf node size

MaxBtSize: the maximum allowed binary tree root node size

MaxTtSize: the maximum allowed ternary tree root node size

MaxMttDepth: the maximum allowed hierarchy depth of multi-type tree splitting from a quadtree leaf MinBtSize: the minimum allowed binary tree leaf node size MinTtSize: the minimum allowed ternary tree leaf node size In one example of the quadtree with nested multi-type tree coding tree structure, the CTU size is set as 128×128 luma samples with two corresponding 64×64 blocks of 4:2:0 chroma samples, the MinQTSize is set as 16×16, the MaxBtSize is set as 128×128 and MaxTtSize is set as 64×64, the MinBtSize and MinTtSize (for both width and height) is set as 4×4, and the MaxMttDepth is set as 4. The quaternary tree partitioning is applied to the CTU first to generate quaternary tree leaf nodes. The quaternary tree leaf nodes may have a size from 16×16 (i.e., the MinQTSize) to 128×128 (i.e., the CTU size). If the leaf QT node is 128×128, it will not be further split by the binary tree since the size exceeds the MaxBtSize and MaxTtSize (i.e., 64×64). Otherwise, the leaf qdtree node can be further partitioned by the multi-type tree. Therefore, the quaternary tree leaf node is also the root node for the multi-type tree and it has multi-type tree depth (mttDepth) as 0. When the multi-type tree depth reaches MaxMttDepth (i.e., 4), no further splitting is considered. When the multi-type tree node has width equal to MinBtSize and smaller or equal to 2*MinTtSize, no further horizontal splitting is considered. Similarly, when the multi-type tree node has height equal to MinBtSize and smaller or equal to 2*MinTtSize, no further vertical splitting is considered.

In VVC, the coding tree scheme supports the ability for the luma and chroma to have a separate block tree structure. For P and B slices, the luma and chroma CTBs in one CTU have to share the same coding tree structure. However, for I slices, the luma and chroma can have separate block tree structures. When the separate block tree mode is applied, luma CTB is partitioned into CUs by one coding tree structure, and the chroma CTBs are partitioned into chroma CUs by another coding tree structure. This means that a CU in an I slice may consist of a coding block of the luma component or coding blocks of two chroma components, and a CU in a P or B slice always consists of coding blocks of all three colour components unless the video is monochrome.

Inter Prediction

For each inter-predicted CU, motion parameters consists of motion vectors, reference picture indices and reference picture list usage index, and additional information needed for the new coding feature of VVC to be used for inter-predicted sample generation. The motion parameters can be signalled in an explicit or implicit manner. When a CU is coded with skip mode, the CU is associated with a PU and has no significant residual coefficients, no coded motion vector delta or reference picture index. A merge mode is specified whereby the motion parameters for the current CU are obtained from neighbouring CUs, including spatial and temporal candidates, and additional schedules introduced in VVC. The merge mode can be applied to any inter-predicted CU, not only for skip mode. The alternative to merge mode is the explicit transmission of motion parameters, where motion vector, corresponding reference picture index for each reference picture list and reference picture list usage flag and other needed information are signalled explicitly for each CU.

Large Block-Size Transforms with High-Frequency Zeroing

In VVC, large block-size transforms, up to 64×64 in size, are enabled. The large-size transforms are primarily useful for higher resolution video, such as 1080p and 4K sequences. High frequency transform coefficients are zeroed out for the transform blocks with size (width or height, or both width and height) equal to 64, so that only the lower-frequency coefficients are retained. For example, for an M×N transform block, with M as the block width and N as the block height, when M is equal to 64, only the left 32 columns of transform coefficients are kept. Similarly, when N is equal to 64, only the top 32 rows of transform coefficients are kept. When transform skip mode is used for a large block, the entire block is used without zeroing out any values. In addition, transform shift is removed in transform skip mode. The VTM (VVC Test Model) also supports configurable max transform size in SPS, such that encoder has the flexibility to choose up to 32-length or 64-length transform size depending on the need of specific implementation.

Subblock Transform (SBT)

In VVC, subblock transform is introduced for an inter-predicted CU. In SBT, only a sub-part of the residual block is coded for the CU. When inter-predicted CU with cu_coded_flag equal to 1, cu_sbt_flag may be signalled to indicate whether the whole residual block or a sub-part of the residual block is coded with transformation process. In the former case, inter MTS (Multi Transform Selection) information is further parsed to determine the transform type of the CU. In the latter case, a part of the residual block is adaptively coded with inferred transform type by side (i.e., which side of the split) and the other part of the residual block is zeroed out.

Figure 5:
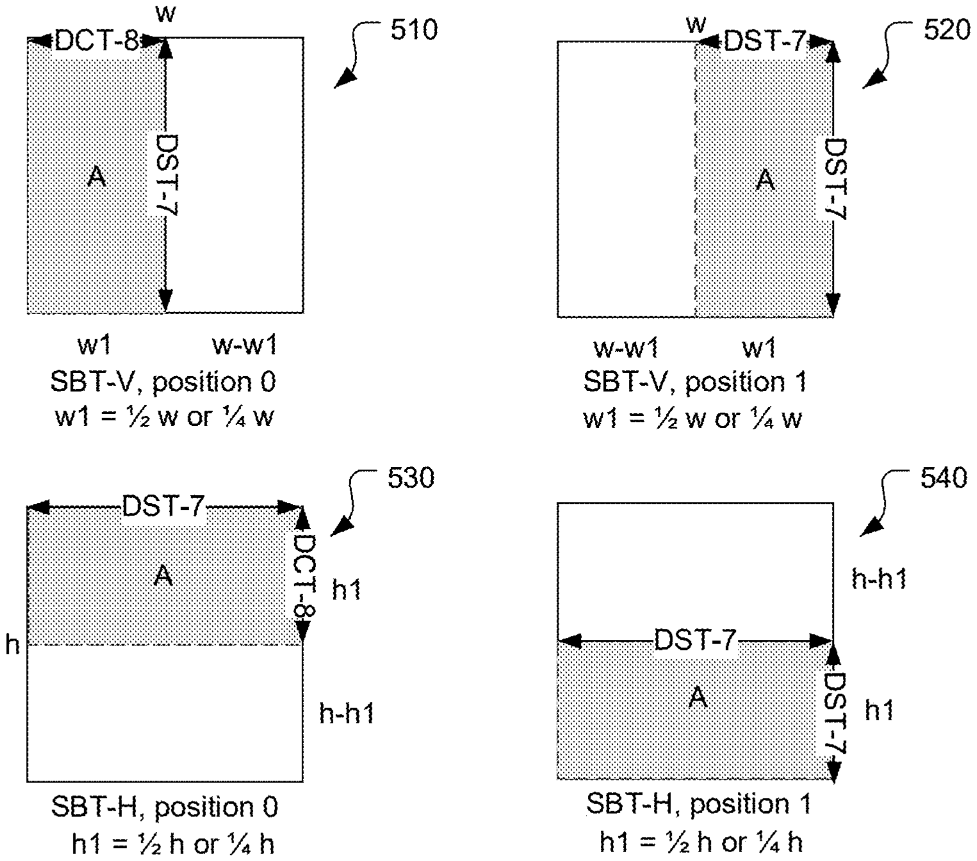
FIG. 5 shows some examples of TT split forbidden when either width or height of a luma coding block is larger than 64.

When SBT is used for an inter-coded CU, SBT type and SBT position information are signalled in the bitstream. SBT type information indicates the TU split types (e.g. split likes a binary tree split or an asymmetric binary tree split) and the split direction (e.g. horizontal split or vertical split), and the corresponding semantic names are cu_sbt_quad_flag and cu_sbt_horizontal_flag in VVC. SBT position information indicates which TU has non-zero residual, and the corresponding semantic name is cu_sbt_pos_flag in VVC. For example, two SBT types and two SBT positions are illustrated in FIG. 5. For SBT-V (510 and 520), the TU width may equal to half of the CU width or ¼ of the CU width, resulting in 2:2 split or 1:3/3:1 split. Similarly, for SBT-H (530 and 540), the TU height may equal to half of the CU height or ¼ of the CU height, resulting in 2:2 split or 1:3/3:1 split. The 2:2 split is like a binary tree (BT) split while the 1:3/3:1 split is like an asymmetric binary tree (ABT) split. In ABT splitting, only the small region contains the non-zero residual. If one dimension (width or height) of a CU size is 8 in luma samples, the 1:3/3:1 split along that dimension is disallowed. There are at most 8 SBT modes for a CU.

Position-dependent transform core selection is applied on luma transform blocks in SBT-V and SBT-H. On the other hand, chroma TB always using DCT-2. The two positions of SBT-H and SBT-V are associated with different core transforms. More specifically, the horizontal and vertical transforms for each SBT position is specified in FIG. 5. For example, the horizontal and vertical transforms for SBT-V position 0 is DCT-8 and DST-7, respectively. When one side of the residual TU is greater than 32, the transform for both dimensions is set as DCT-2. Therefore, the subblock transform jointly specifies the TU tiling, cbf, and horizontal and vertical core transform type of a residual block. Note, the SBT is not applied to the CU coded with combined inter-intra mode in VVC.

To reduce encoder run-time, some fast algorithms have been developed in RDO (Rate-Distortion Optimization) of SBT:

Algorithm 1: For each SBT mode, a RD (Rate-Distortion) cost is estimated based on the Sum of Squared Differences (SSD) of the residual-skipped part. An SBT mode is skipped in RDO if the estimated RD cost of the SBT mode is larger than the actual RD cost of the best mode. In addition, only the best 4 SBT modes in terms of the estimated RD cost are tried in RDO.

Algorithm 2: a transform mode save & load is applied (which is improved from that proposed in JVET-K0358). The residual energy (i.e., SSD) and the best transform mode (one among whole block transform with DCT-2, whole block transform with inter MTS, and sub-block transform) of a PU is saved as history information. When the residual energy of a PU matches a previous case, the best transform mode associated with the residual energy is tried while the other transform modes are skipped. This fast algorithm reduces the encoding time of both SBT and inter MTS.

Algorithm 3: if the RD cost of whole residual block being transformed by DCT-2 is much worse than the current best RD cost, the SBT is skipped.

Algorithm 4: if the RD cost of whole residual block being transformed by DCT-2 is small enough, the SBT is skipped.

In the following, several methods for saving the signalling overhead of SBT or improving the coding efficiency are disclosed.

According to embodiments of the present invention, the final position of the sub-part of a residual block in SBT (e.g., cu_sbt_pos_flag in VVC) can be implicitly derived. In one embodiment, the final position can be implicitly derived according to boundary matching, where the boundary matching cost between the current prediction samples and the neighbouring reconstruction samples of each sub-part TU is checked. If a sub-part TU has the maximum boundary matching difference among all sub-part TUs, the sub-part TU is implicitly inferred to have non-zero residuals and should further apply transform or inverse transform process, and the other sub-part TU is set to have all zero residuals.

For example, if the current SBT type is SBT-H with BT split (i.e., split 610 in FIG. 6A), the boundary matching difference of TU "C" is $diff_C=\Sigma|reco_e-pred_f|$, where $reco_e$ is the neighbouring reconstruction samples of "e", and $pred_f$ is the prediction samples of "f". Similarly, the boundary matching difference of TU "D" is $diff_D=\Sigma|reco_g-pred_h|$, where $reco_g$ is the neighbouring reconstruction samples of "g", and $pred_h$ is the prediction samples of "h". If $diff_C>diff_D$, TU "C" is the sub-part with non-zero residuals. Otherwise, if $diff_D>diff_C$, TU "D" is the sub-part with non-zero residuals.

For another example, if the current SBT type is SBT-V with BT split (i.e., split 630 in FIG. 6C), the boundary matching difference of TU "A" is $diff_A=\Sigma|reco_a-pred_b|$, where $reco_a$ is the neighbouring reconstruction samples of "a", and $pred_b$ is the prediction samples of "b". Similarly, the boundary matching difference of TU "B" is $diff_B=\Sigma|reco_c-pred_d|$, where $reco_c$ is the neighbouring reconstruction samples of "c", and $pred_d$ is the prediction samples of "d". If $diff_A>diff_B$, TU "A" is the sub-part with non-zero residuals. Otherwise, if $diff_B>diff_A$, TU "B" is the sub-part with non-zero residuals.

For another example, if the current SBT type is SBT-H with ABT split (i.e., splits 620 and 622 in FIG. 6B), the boundary matching difference of TU "E" is $diff_E=\Sigma|reco_i-pred_j|$, where $reco_i$ is the neighbouring reconstruction samples of "i", and $pred_j$ is the prediction samples of "j". Similarly, the boundary matching difference of TU "F" is $diff_F=\Sigma|reco_o-pred_p|$, where $reco_o$ is the neighbouring reconstruction samples of "o", and $pred_p$ is the prediction samples of "p". If $diff_E>diff_F$, TU "E" is the sub-part with non-zero residuals. Otherwise, if $diff_F>diff_E$, TU "F" is the sub-part with non-zero residuals. For still the same example, if $\Sigma|reco_k-pred_l|>\Sigma|reco_m-pred_n|$, TU "F" is the sub-part with non-zero residuals. If $\Sigma|reco_k-pred_l|<\Sigma|reco_m-pred_n$, TU "E" is the sub-part with non-zero residuals, where $reco_k$ is the neighbouring reconstruction samples of "k", $pred_l$ is the prediction samples of "l", $reco_m$ is the neighbouring reconstruction samples of "m", and $pred_n$ is the prediction samples of "n".

For another example, if the current SBT type is SBT-V with ABT split (i.e., splits 640 and 642 in FIG. 6D), the boundary matching difference of TU "G" is $diff_G=\Sigma|reco_q-pred_r|$, where $reco_q$ is the neighbouring reconstruction samples of "q", and $pred_r$ is the prediction samples of "r". Similarly, the boundary matching difference of TU "H" is $diff_H=\Sigma|reco_w-pred_x|$, where $reco_w$ is the neighbouring reconstruction samples of "w", and $pred_x$ is the prediction samples of "x". If $diff_G>diff_H$, TU "G" is the sub-part with non-zero residuals. Otherwise, if $diff_H>diff_G$, TU "H" is the sub-part with non-zero residuals. For still the same example, if $\Sigma|reco_s-pred_t|>\Sigma|reco_u-pred_v|$, TU "H" is the sub-part with non-zero residuals. If $\Sigma|reco_s-pred_t|<\Sigma|reco_u-pred_v|$, TU "G" is the sub-part with non-zero residuals, where $reco_u$ is the neighbouring reconstruction samples of "s", $pred_t$ is the prediction samples of "t", $reco_u$ is the neighbouring reconstruction samples of "u", and $pred_v$ is the prediction samples of "v".

In more details, when doing boundary matching, a boundary matching difference for a candidate mode refers to the discontinuity measurement (e.g. including top boundary matching and/or left boundary matching) between the current prediction (i.e., the predicted samples within the current block) and the neighbouring reconstruction (e.g., the reconstructed samples within one or more neighbouring blocks) as shown in FIG. 7 for a current block 710. Top boundary matching means the comparison between the current top predicted samples and the neighbouring top reconstructed samples, and left boundary matching means the comparison between the current left predicted samples and the neighbouring left reconstructed samples.

In one embodiment, a pre-defined subset of the current prediction is used to calculate the boundary matching difference. N line(s) of top boundary within the current block and/or M line(s) of left boundary within the current block are used. Moreover, M and N can be further determined depending on the current block size. For example, with the samples depicted in FIG. 7 the boundary matching difference can be formulated as:

$$diff = \sum_{x=0}^{block\ width} \left(\left|a*pred_{x,0} - b*pred_{x,1} - c*reco_{x,-1}\right| + \left|d*reco_{x,-1} - e*pred_{x,0} - f*reco_{x,-2}\right|\right) + \sum_{y=0}^{block\ height} \left(\left|g*pred_{0,y} - h*pred_{1,y} - i*reco_{-1,y}\right| + \left|j*reco_{-1,y} - k*pred_{0,y} - l*reco_{-2,y}\right|\right)$$

In the above equation, the weights (a, b, c, d, e, f, g, h, i, j, k, l) can be any positive integers or equal to 0. For example, following list many possible embodiments for the weights:

$-a=2, b=1, c=1, d=2, e=1, f=1,$ $g=2, h=1, i=1, j=2, k=1, l=1.$ $-a=2, b=1, c=1, d=0, e=0, f=0,$ $g=2, h=1, i=1, j=0, k=0, l=0.$ $-a=0, b=0, c=0, d=2, e=1, f=1,$ $g=0, h=0, i=0, j=2, k=1, l=1.$ $-a=1, b=0, c=1, d=0, e=0, f=0,$ $g=1, h=0, i=1, j=0, k=0, l=0.$ $-a=2, b=1, c=1, d=2, e=1, f=1,$ $g=1, h=0, i=1, j=0, k=0, l=0.$ $-a=1, b=0, c=1, d=0, e=0, f=0,$ $g=2, h=1, i=1, j=2, k=1, l=1.$

Figure 8:
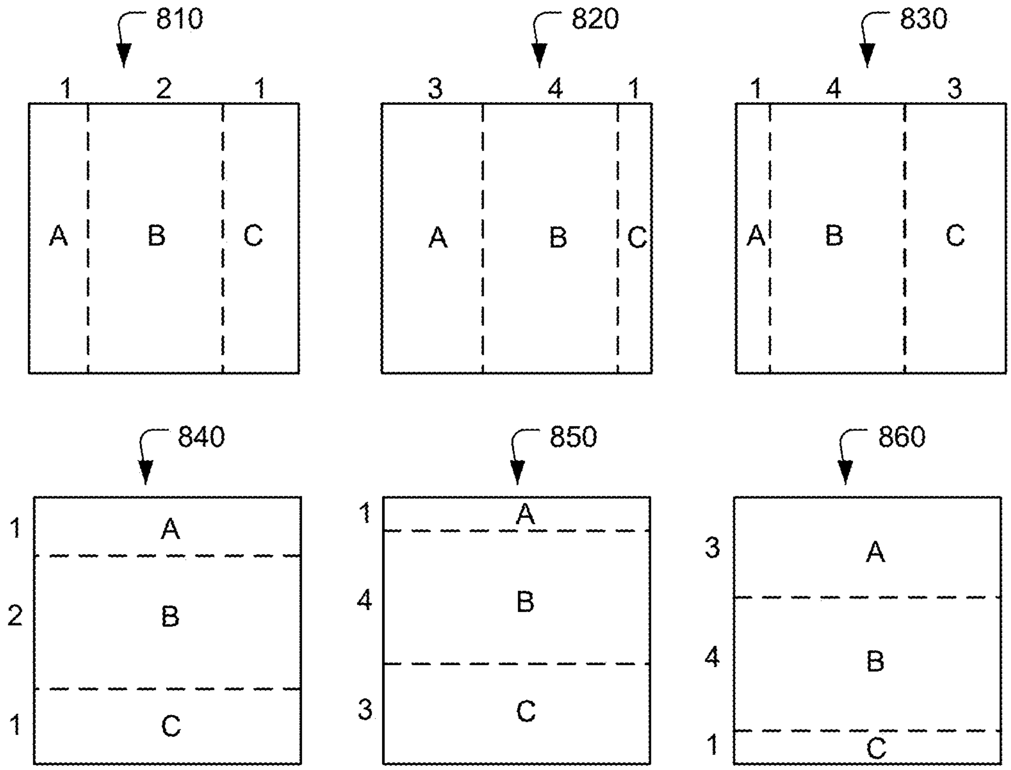
FIG. 8 illustrates an examples of splits including 1:2:1, 3:4:1, and 1:4:3 for SBT-V with TT split and 1:2:1, 1:4:3, and 3:4:1 for SBT-H with TT split, where only TU "B" has non-zero residuals.
Figure 9:
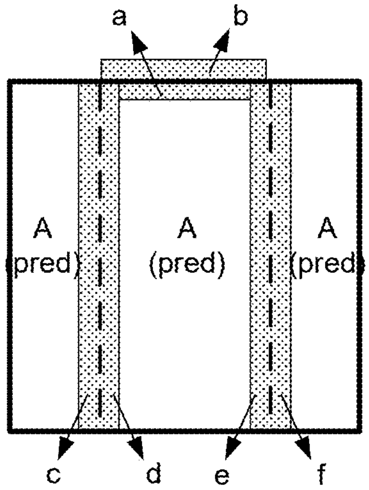
FIG. 9 illustrates an example of regions (i.e., a~f) used to calculate difference value of TU "B" according to an embodiment of the present invention, where only TU "B" has non-zero residuals.

If more hypothetical positions are allowed for SBT-H and SBT-V types (e.g., 1:4:3, 1:2:1, or 3:4:1 TT-like split as shown in FIG. 8), where only TU "B" has non-zero residuals, the final position can be implicitly derived by checking the boundary matching difference not only between the current prediction samples and the neighbouring reconstruction samples of each sub-part TU, but also the current prediction samples difference along the inner TU boundaries of the current block. In FIG. 8, the 1:2:1 (810), 3:4:1 (820) and 1:4:3 (830) SBT-V with TT splits, and the 1:2:1 (840), 1:4:3 (850) and 3:4:1 (860) SBT-H with TT splits are shown. For the position examples in FIG. 8, if SBT-V is used for the current block, residuals can be added to TU "B" to each hypothetical positions. Then, the difference value along the TU "B" boundary is calculated, and the hypothetical position has the lowest difference value is selected as the final position of the sub-part TU with residual. In more details, take FIG. 9 as an example, where only TU "B" has non-zero residuals, the difference value of TU "B" can be derived by $diff_b=\Sigma|reco_b-pred_a|+\Sigma|pred_d-pred_c|+\Sigma|pred_e-pred_f|$, where $reco_b$ is the reconstruction samples of "b". $pred_a$, $pred_c$, $pred_a$, $pred_e$, $pred_f$ are the prediction samples of "a", "c", "d", "e", "f", respectively. For a given SBT split type has many hypothetical positions, the calculation of $cost_b$ is applied to each hypothetical position, then the hypothetical position has the lowest difference value is the final position of the sub-part TU with residual. Note, the proposed method is not limited to 1:1, 1:3, 3:1, 1:4:3, 1:2:1, or 3:4:1 split. Instead, other SBT types can be applied.

Figure 10A:
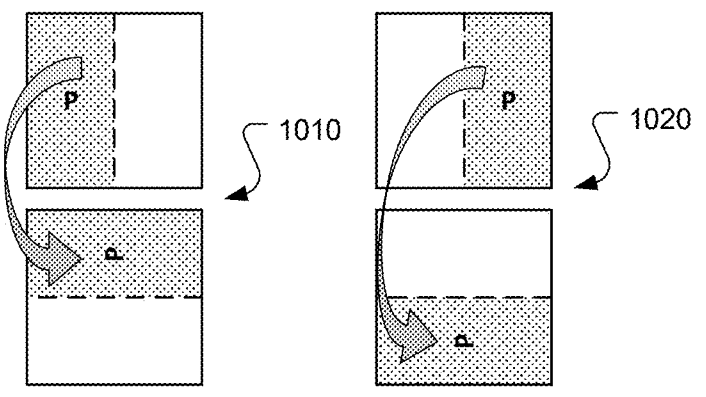
FIGS. 10A-C illustrate examples for implicitly deriving the partition direction in SBT using rotating (FIG. 10A), flipping (FIG. 10B) and clipping/pasting (FIG. 10C).
Figure 10B:
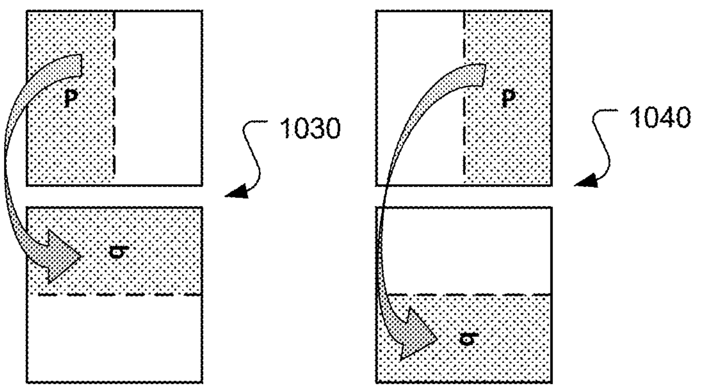
Figure 10C:
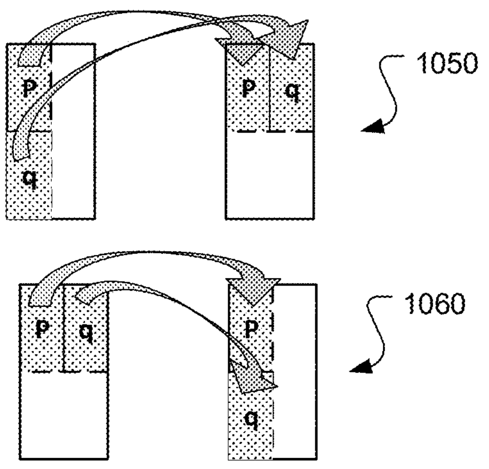

The partition direction in SBT (e.g., cu_sbt_horizontal_flag in VVC) can be implicitly derived by flipping, rotating, or clipping/pasting the residual blocks and checking the boundary matching difference between the current prediction samples and the neighbouring reconstruction samples of each candidate SBT coding mode. FIGS. 10A-C illustrate examples of the above invention. In FIG. 10A, the implicit partition direction is determined by rotating the residual blocks (1010 and 1020). In FIG. 10B, the implicit partition direction is determined by flipping the residual blocks (1030 and 1040). In FIG. 10C, the implicit partition direction is determined by clipping/pasting the residual blocks (1050 and 1060). For example, if BT split is used for the current SBT-coded block, the current SBT-coded block can have four candidate SBT coding modes as shown in FIG. 5. Assume the current transform block size is the same as the gray area of "SBT-V position 0", the boundary matching difference value can be calculated by the methods mentioned above, and the candidate SBT coding mode has the maximal boundary difference value is the final SBT coding mode. In still another example, clip/paste can be used for the residual block of region "A" of SBT-H, as the examples in FIG. 10C.

If BT split is used for the current SBT-coded block, the initial assumed transform width can be max (block width, block height), and the assumed transform height is min (block width, block height)/2. In still another embodiment, the initial assumed transform width is max (block width, block height)/2, and the assumed transform height is min (block width, block height). If 1:3/3:1 ABT split is used for the current SBT-coded block, the initial assumed transform width can be max (block width, block height), and the assumed transform height is min (block width, block height)/4. In still another embodiment, the initial assumed transform width is max (block width, block height)/4, and the assumed transform height is min (block width, block height).

In still another embodiment, the boundary matching cost of each hypothetical position (assuming the total hypothetical positions being N) can be calculated by the current prediction samples and the neighbouring reconstruction samples, and the first k out of N hypothetical positions with maximal boundary matching difference are chosen, where N and k are positive integers and N>k. Then, the final hypothetical position and SBT type is further determined from these k hypothetical positions (e.g., k can be 2, 3, 4, . . . , or N−1) by the signalled index in the bitstream.

In another embodiment of the present invention, if the current block is coded by SBT, the position of the sub-part block with non-zero residuals of the current block (e.g., cu_sbt_pos_flag in VVC) can be implicitly derived. According to this embodiment, the position can be implicit derived by boundary matching, where adding the reconstructed residuals to the current prediction samples depends on the hypothetical position of the non-zero residual sub-part block, and checking the boundary matching cost of each hypothetical position with neighboring L-shape reconstruction samples. The boundary matching cost can be the difference value between the current boundary reconstruction samples and the neighbouring reconstruction samples of the current block. If a hypothetical position has the best boundary matching cost than other hypothetical positions (e.g., minimal difference value), the non-zero residual sub-part block position of the hypothetical position is implicitly inferred as the final position of the sub-part block with non-zero residuals of the current block, and the other sub-part TU has all zero residuals.

Figure 11A:
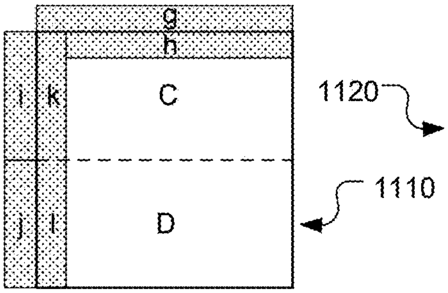
FIGS. 11A-D illustrate an examples of the regions used for boundary matching calculation for different SBTs according to one embodiment of the present invention.

For example, if the current SBT type is SBT-H with BT split (e.g. split 1110 in FIG. 11A), the hypothetical positions of the non-zero residual sub-part block are "C" and "D". For the hypothetical position "C", the residuals are added to the prediction samples in "C", and the boundary matching cost is $cost_C=\Sigma|reco_g-(pred_h+resi_h)|+\Sigma|reco_i-(pred_k+resi_k)|+\Sigma|reco_j-pred_l|$, where $reco_g$, $reco_i$, and $reco_j$ are the neighboring reconstruction samples in "g", "i", and "j", respectively. $pred_h$, $pred_k$, and $pred_l$ are the prediction samples of "h", "k", and "l", respectively. $resi_h$ and $resi_k$ are the prediction samples of "h" and "k", respectively. Similarly, for the hypothetical position "D", the residuals are added to the prediction samples in "D", and the boundary matching cost is $cost_D=\Sigma|reco_g-pred_h|+\Sigma|reco_i-pred_k|+\Sigma|reco_j-(pred_l+resi_l)$, where $resi_l$ is the prediction samples of "l". If $cost_C<cost_D$, TU "C" is the sub-part with non-zero residuals. Otherwise (i.e., $cost_D\geq cost_C$), TU "D" is the sub-part with non-zero residuals. As shown in the above boundary matching cost calculation, when calculating the cost for position "C", the boundary regions "h" and "k" in "C" use reconstructed sample values (i.e., ($pred_h$+$resi_h$) and ($pred_k$+$resi_k$) respectively), while the non-"C" (referred as remaining subblock(s) of "C") boundary region "1" uses predicted samples. Similar rule applies to position "D", where boundary region(s) of "D" uses reconstructed sample values and boundary region(s) of non-"D" (referred as remaining sub-blocks of "D") uses reconstructed sample values.

Figure 11B:
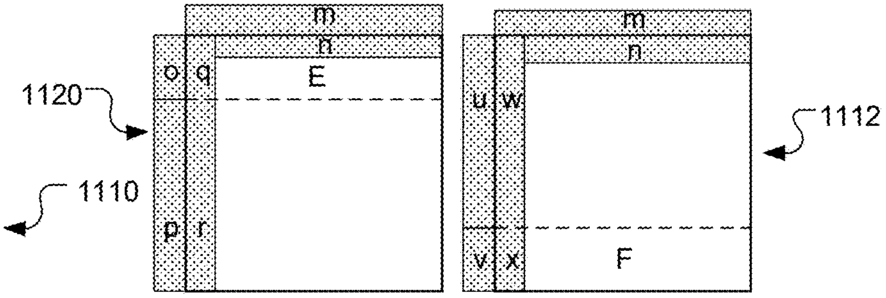

For example, if the current SBT type is SBT-H with ABT split (e.g. splits 1120 and 1122 in FIG. 11B), the hypothetical positions of the non-zero residual sub-part block are "E" and "F". For the hypothetical position "E", the residuals are added to the prediction samples in "E", and the boundary matching cost is $cost_E=\Sigma|reco_m-(pred_n+resi_n)|+\Sigma|reco_o-(pred_q+resi_q)|+\Sigma|reco_p-pred_r|$, where $reco_m$, $reco_o$, and $reco_p$ are the neighboring reconstruction samples in "m", "o", and "p", respectively. $pred_n$, $pred_q$, and $pred_r$ are the prediction samples of "n", "q", and "r", respectively. $resi_n$ and $resi_q$ are the prediction samples of "n" and "q", respectively. Similarly, for the hypothetical position "F", the residuals are added to the prediction samples in "F", and the boundary matching cost is $cost_F=\Sigma|reco_m-pred_n|+\Sigma|reco_u-pred_w|+\Sigma|reco_{hh}-(pred_v+resi_x)|$, where $resi_x$ is the prediction samples of "x". If $cost_E<cost_F$, TU "E" is the sub-part with non-zero residuals. Otherwise (i.e., $cost_E \geq cost_F$), TU "F" is the sub-part with non-zero residuals.

Figure 11C:
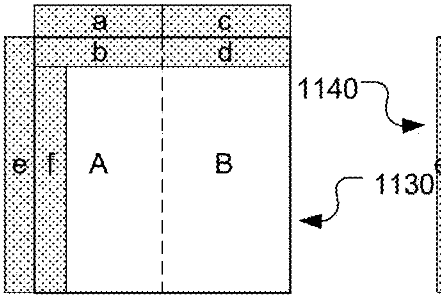

For example, if the current SBT type is SBT-V with BT split (e.g. split 1130 in FIG. 11C), the hypothetical positions of the non-zero residual sub-part block are "A" and "B". For the hypothetical position "A", the residuals are added to the prediction samples in "A", and the boundary matching cost is $cost_A=\Sigma|reco_a-(pred_c+resi_c)|+\Sigma|reco_e-(pred_f+resi_f)|+\Sigma|reco_b-pred_d|$, where $reco_a$, $reco_e$, and $reco_b$ are the neighboring reconstruction samples in "a", "e", and "b", respectively. $pred_c$, $pred_f$, and $pred_d$ are the prediction samples of "c", "f", and "d", respectively. $resi_c$ and $resi_f$ are the prediction samples of "c" and "f", respectively. Similarly, for the hypothetical position "B", the residuals are added to the prediction samples in "B", and the boundary matching cost is $cost_B=\Sigma|reco_a-pred_c|+\Sigma|reco_e-pred_f|+\Sigma|reco_b-(pred_d+resi_d)|$, where $resi_d$ is the prediction samples of "d". If $cost_A<cost_B$, TU "A" is the sub-part with non-zero residuals. Otherwise (i.e., $cost_A \geq cost_B$), TU "B" is the sub-part with non-zero residuals.

Figure 11D:
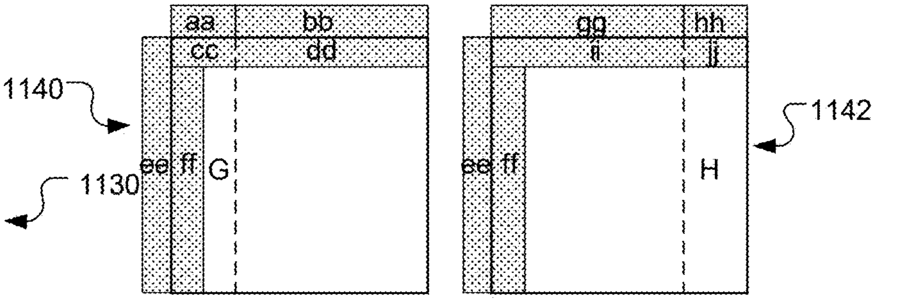

For example, if the current SBT type is SBT-V with ABT split (e.g. splits 1140 and 1142 in FIG. 11D), the hypothetical positions of the non-zero residual sub-part block are "G" and "H". For the hypothetical position "G", the residuals are added to the prediction samples in "G", and the boundary matching cost is $cost_G=\Sigma|reco_{aa}-(pred_{cc}+resi_{cc})+\Sigma|reco_{ee}-(pred_{ff}+resi_{ff})|+\Sigma|reco_{bb}-pred_{dd}|$, where $reco_{aa}$, $reco_{ee}$, and $reco_{bb}$ are the neighboring reconstruction samples in "aa", "ee", and "bb", respectively. $pred_{cc}$, $pred_{ff}$, and $pred_{dd}$ are the prediction samples of "cc", "ff", and "dd", respectively. $resi_{cc}$ and $resi_{ff}$ are the prediction samples of "cc" and "ff", respectively. Similarly, for the hypothetical position "H", the residuals are added to the prediction samples in "H", and the boundary matching cost is $cost_H=\Sigma|reco_{gg}-pred_{ii}|+\Sigma|reco_{ee}-pred_{ff}|+\Sigma|reco_{hh}-(pred_{jj}+resi_{jj})|$, where $resi_{jj}$ is the prediction samples of "jj". If $cost_G<cost_H$, TU "G" is the sub-part with non-zero residuals. Otherwise (i.e., $cost_G \geq cost_H$), TU "H" is the sub-part with non-zero residuals.

In more details, when doing boundary matching according to the above method, a boundary matching cost for a candidate mode refers to the discontinuity measurement (e.g., including top boundary matching and/or left boundary matching) between the neighbouring reconstruction (e.g., the reconstructed samples within one or more neighbouring blocks) and the current prediction may with or without residual (e.g., depends on the hypothetical position). Top boundary matching means the comparison between the neighbouring top reconstructed samples and the current top predicted samples may with or without residual, and left boundary matching means the comparison between the neighbouring left reconstructed samples and the current left predicted samples may with or without residual.

Figure 12:
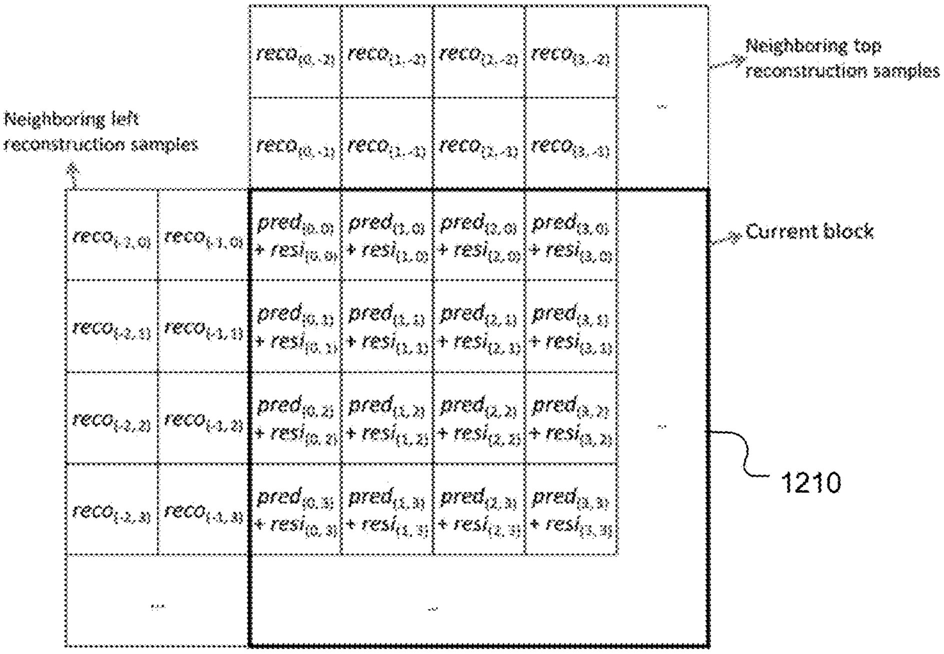
FIG. 12 illustrates examples of samples involved in boundary matching cost calculation according to another embodiment of the present invention.

In one embodiment, a pre-defined subset of the current prediction is used to calculate the boundary matching cost. N line(s) of top boundary within the current block and/or M line(s) of left boundary within the current block are used. Moreover, M and N can be further determined depending on the current block size. For example, with the samples depicted in FIG. 12, the boundary matching cost can be formulated as:

$$
\begin{aligned}
cost = &\sum_{x=0}^{block\ width}\Big(\big|a\times(pred_{x,0}+resi_{x,0})-b\times(pred_{x,1}+resi_{x,1})-c\times reco_{x,-1}\big| + \\
&\big|d\times reco_{x,-1}-e\times(pred_{x,0}+resi_{x,0})-f\times reco_{x,-2}\big|\Big) + \\
&\sum_{y=0}^{block\ height}\Big(\big|g\times(pred_{0,y}+resi_{0,y})-h\times(pred_{1,y}+resi_{1,y})-i\times reco_{-1,y}\big| + \\
&\big|j\times reco_{-1,y}-k\times(pred_{0,y}+resi_{0,y})-l\times reco_{-2,y}\big|\Big)
\end{aligned}
$$

In the above equation, the weights (a, b, c, d, e, f, g, h, i, j, k, l) can be any positive integers or equal to 0. For example, (a, b, c, d, e, f, g, h, i, j, k, l) can use the exemplary values mentioned earlier.

If more hypothetical positions are allowed for SBT-H and SBT-V types (e.g., 1:4:3, 1:2:1, or 3:4:1 TT-like split as shown in FIG. 8), the position can be implicit derived by boundary matching. In one embodiment, the reconstructed residuals are added to the current prediction samples depends on the hypothetical position of the non-zero residual sub-part block and checking the boundary matching cost of each hypothetical position with neighbouring L-shape reconstruction samples. If a hypothetical position has the best boundary matching cost than other hypothetical positions (e.g., minimal difference value), the non-zero residual sub-part block position of the hypothetical position is implicitly inferred as the final position of the sub-part block with non-zero residuals of the current block, and the other sub-part TU is set to have all zero residuals.

In another embodiment, the final position of the sub-part TU with residual can be implicitly derived by checking the boundary matching cost not only between the current prediction samples and the neighbouring reconstruction samples of each sub-part TU, but also between the current prediction samples and the current prediction samples with residual samples. For the position examples in FIG. 9, where only TU "B" is assumed to have non-zero residuals, if SBT-V is used for the current block, residuals can be added to TU "B" to each candidate. Then, the boundary matching cost along the TU "B" boundary is calculated, and the hypothetical position has the minimal cost is selected as the final position of the sub-part TU with residual. In more details, take FIG. 8 as an example, the boundary matching cost of TU "B" can be derived by $cost_b=\Sigma|reco_b-(pred_a+$ $resi_a)|+\Sigma|(pred_d+resi_d)-pred_c|+\Sigma|(pred_e+resi_e)-pred_f|$, where $reco_b$ is the reconstruction samples of "b". $pred_a$, $pre_c$, $pred_d$, $pred_e$, $pred_f$ are the prediction samples of "a", "c", "d", "e", "f", respectively. $resi_a$, $resi_d$, $resi_e$ are the (reconstructed) residual samples of "a", "d", "e", respectively.

In another embodiment, the final position of the sub-part TU with residual can be implicitly derived by specific horizontal and vertical transforms according to hypothetical position. For example, as shown in FIG. 5, the position 0 and position 1 uses different horizontal and vertical transforms. To implicitly derive the final position of the sub-part TU with residual, the reconstructed coefficients are input to inverse transform according to hypothetical position (e.g., the horizontal and vertical transforms for SBT-V position 0 is DCT-8 and DST-7, and SBT-V position 1 is DST-7 and DST-7), the reconstructed residuals are then added to the corresponding prediction samples, and checking the boundary matching cost of each hypothetical position with neighbouring L-shape reconstruction samples. In still another embodiment, if more hypothetical positions are allowed for SBT-H and SBT-V types (e.g., 1:4:3, 1:2:1, or 3:4:1 TT-like split as shown in FIG. 8), more combinations of horizontal and vertical transforms for each hypothetical position can be designed, and input the reconstructed coefficients to the corresponding transform combination according to hypothetical position, and check the boundary matching cost of each hypothetical position with neighbouring L-shape reconstruction samples.

In still another embodiment, N hypothetical positions with the same SBT type can share the same horizontal and vertical transform settings, and the first k out of N hypothetical positions with better boundary matching cost are chosen. Then, the final hypothetical position out of these k hypothetical positions (e.g., k can be 2, 3, 4, . . . , or N−1) is signalled in the bitstream.

In still another embodiment, the reconstructed transform coefficients can be applied by the assumed transform size with the inverse transform combinations according to each hypothetical position (assuming the total hypothetical positions being J), and the first i out of J hypothetical positions with better boundary matching cost are chosen. Then, the final hypothetical position and SBT type is further determined from these i hypothetical positions (e.g., i can be 2, 3, 4, . . . , or J−1) by the signalled index in the bitstream.

Any of the foregoing proposed methods can be implemented in encoders and/or decoders. For example, any of the proposed methods can be implemented in an inter/intra/prediction/transform module of an encoder, and/or an inverse transform/inter/intra/prediction module of a decoder. Alternatively, any of the proposed methods can be implemented as a circuit coupled to the inverse transform/inter/intra/prediction module of the encoder and/or the inter/intra/prediction/transform module of the decoder, so as to provide the information needed by the inter/intra/prediction/transform module.

Figure 1B:
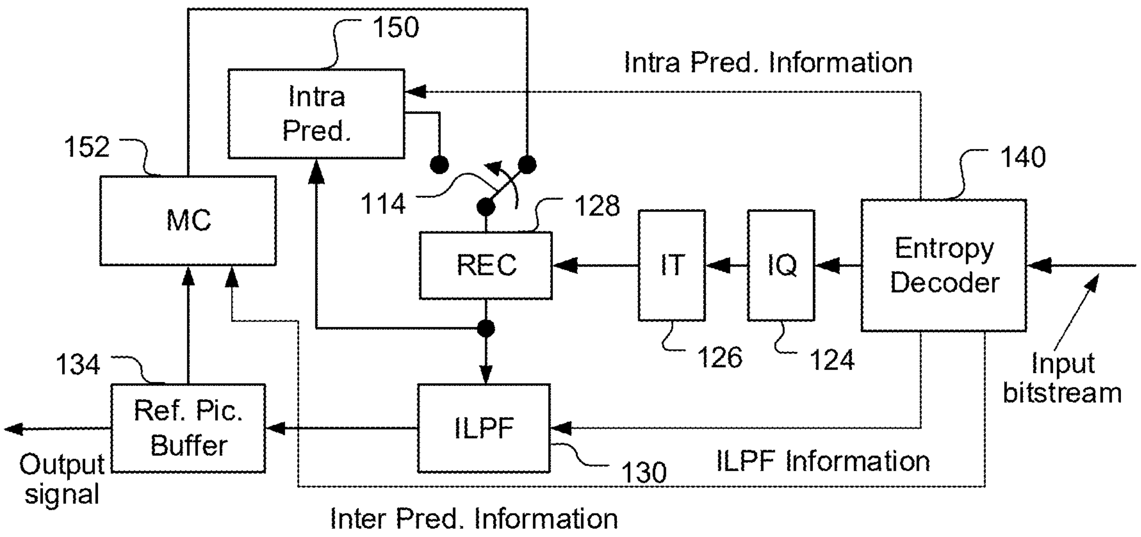
FIG. 1B illustrates a corresponding decoder for the encoder in FIG. 1A.

Any of the foregoing Sub-Block Transform (SBT) Coding can be implemented in encoders and/or decoders. For example, any of the proposed methods can be implemented in transform module (e.g. "T" 118 in FIG. 1A) of an encoder, and/or an inverse transform module (e.g. "IT" 126 in FIG. 1B) of a decoder. However, the encoder or the decoder may also use additional processing units to implement the required processing. Alternatively, any of the proposed methods can be implemented as a circuit coupled to the inter/intra/prediction module of the encoder and/or the inter/intra/prediction module of the decoder, so as to provide the information needed by the inter/intra/prediction module. Furthermore, signalling related to the proposed methods may be implemented using Entropy Encoder 122 in the encoder or Entropy Decoder 140 in the decoder.

Figure 13:
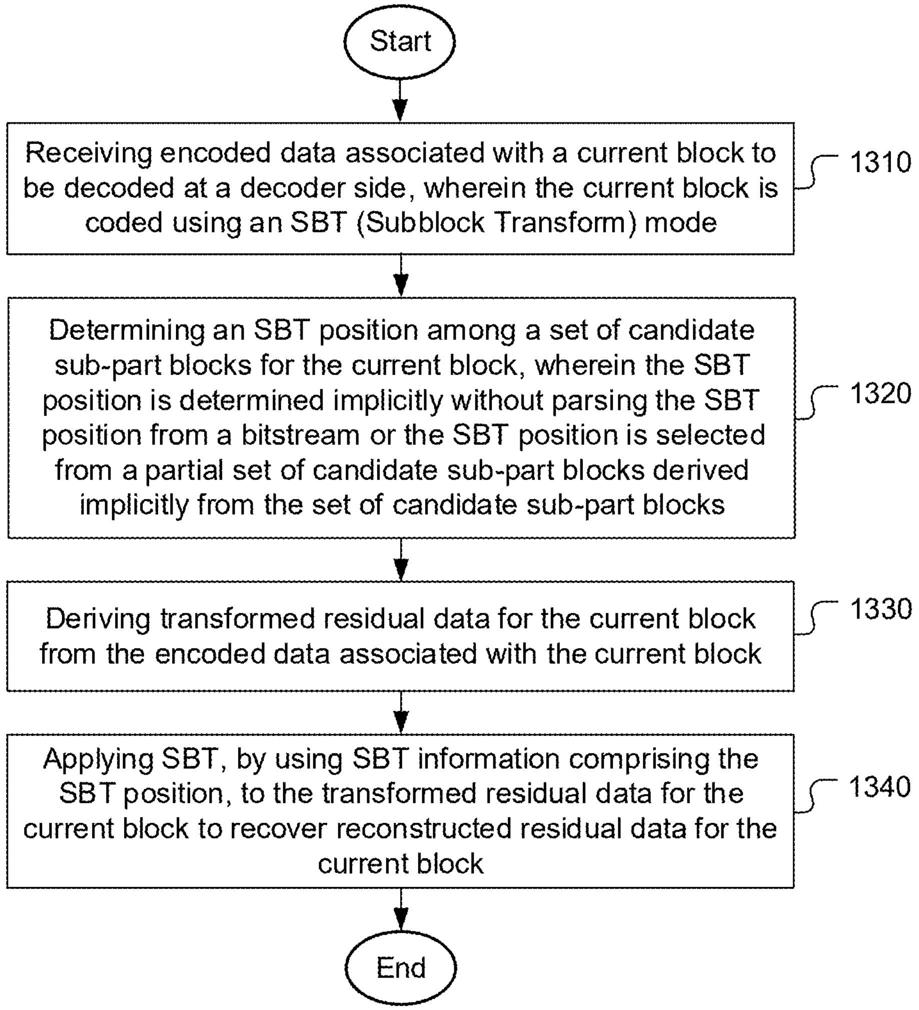
FIG. 13 illustrates a flowchart of an exemplary video coding system that derives the SBT position implicitly according to one embodiment of the present invention.

FIG. 13 illustrates a flowchart of an exemplary video decoding system that derives the SBT position implicitly according to one embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, encoded data associated with a current block to be decoded are received at a decoder side in step 1310, wherein the current block is coded using an SBT (Subblock Transform) mode. An SBT position is determined among a set of candidate sub-part blocks for the current block in step 1320, wherein the SBT position is determined implicitly without parsing the SBT position from a bitstream or the SBT position is selected from a partial set of candidate sub-part blocks derived implicitly from the set of candidate sub-part blocks. Transformed residual data are derived for the current block from the encoded data associated with the current block in step 1330. SBT is applied to the transformed residual data for the current block, by using SBT information comprising the SBT position, to recover reconstructed residual data for the current block in step 1340.

Figure 14:
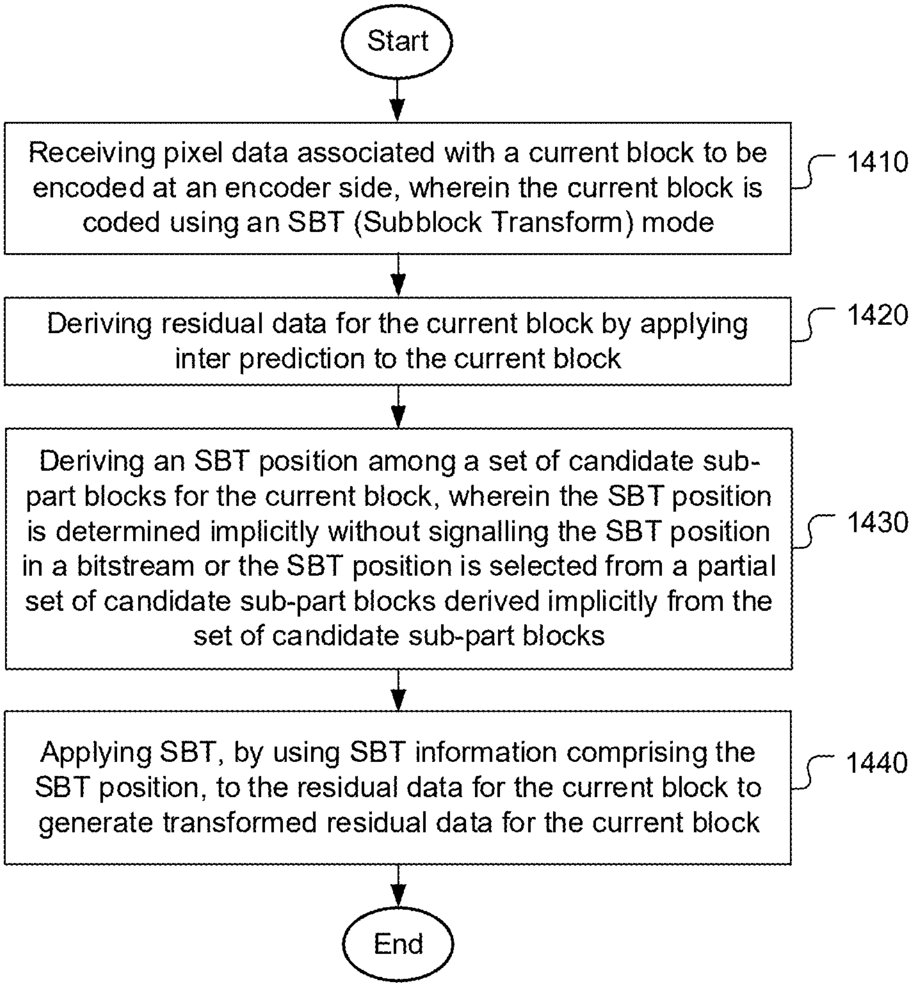
FIG. 14 illustrates a flowchart of an exemplary video encoding system that derives the SBT position implicitly according to one embodiment of the present invention.

FIG. 14 illustrates a flowchart of an exemplary video encoding system that derives the SBT position implicitly according to one embodiment of the present invention. According to this method, pixel data associated with a current block to be encoded at an encoder side are received in step 1410, wherein the current block is coded using an SBT (Subblock Transform) mode. Residual data for the current block are derived by applying inter prediction to the current block in step 1420. An SBT position is derived among a set of candidate sub-part blocks for the current block in step 1430, wherein the SBT position is determined implicitly without signalling the SBT position in a bitstream or the SBT position is selected from a partial set of candidate sub-part blocks derived implicitly from the set of candidate sub-part blocks. SBT is applied to the residual data for the current block, by using SBT information comprising the SBT position, to generate transformed residual data for the current block in step 1440.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video decoding, the method comprising:
- receiving encoded data associated with a current block to be decoded at a decoder side, wherein the current block is coded using an SBT (Subblock Transform) mode;
- determining an SBT position among a set of candidate sub-part blocks for the current block, wherein the SBT position is determined implicitly without parsing the SBT position from a bitstream or the SBT position is selected from a partial set of candidate sub-part blocks derived implicitly from the set of candidate sub-part blocks, wherein the SBT position is determined according to boundary matching cost derived from one or more neighbouring samples of the current block and one or more corresponding boundary samples of the current block for the set of candidate sub-part blocks;
- deriving transformed residual data for the current block from the encoded data associated with the current block; and
- applying SBT, by using SBT information comprising the SBT position, to the transformed residual data for the current block to recover reconstructed residual data for the current block.

2. The method of claim 1, wherein boundary matching costs are derived for the set of candidate sub-part blocks, and wherein one boundary matching cost is determined for each candidate sub-part block based on differences derived from predicted samples of said one or more corresponding boundary samples of the current block and reconstructed samples of said one or more neighbouring samples of the current block for said each candidate sub-part block.

3. The method of claim 2, wherein the SBT position is determined according to a target candidate sub-part block having a largest boundary matching cost among the boundary matching costs for the set of candidate sub-part blocks.

4. The method of claim 1, wherein boundary matching costs are derived for the set of candidate sub-part blocks, and wherein one boundary matching cost is determined for each candidate sub-part block based on first differences derived from reconstructed samples of said one or more corresponding boundary samples of the current block and reconstructed samples of said one or more neighbouring samples of the current block for said each candidate sub-part block with residual and second differences derived from predicted samples of said one or more corresponding boundary samples of the current block and said reconstructed samples of said one or more neighbouring samples of the current block for each candidate sub- part block without residual, the reconstructed samples of said one or more corresponding boundary samples of the current block are generated by adding reconstructed residual samples of the current block to predicted samples of said each candidate sub-part block.

5. The method of claim 4, wherein the SBT position is determined according to a target candidate sub-part block having a smallest boundary matching cost among the boundary matching costs for the set of candidate sub-part blocks.

6. The method of claim 1, wherein said one or more neighbouring samples of the current block comprise top neighbouring samples of the current block, left neighbouring samples of the current block, or both.

7. The method of claim 1, wherein the set of candidate sub-part blocks comprises sub-part blocks generated using SBT-V with BT split, SBT-H with BT split, SBT-V with ABT split, SBT-H with ABT split, SBT-V with TT split, SBT-H with TT split, or a combination thereof.

8. The method of claim 1, wherein an SBT partition direction is implicitly determined.

9. The method of claim 8, wherein the SBT partition direction is implicitly determined by comparing boundary matching costs associated with hypothetical positions resulted from flipping, rotating, or clipping/pasting contents of residual block of the current block.

10. The method of claim 1, wherein an SBT partition type is implicitly determined.

11. The method of claim 1, wherein the partial set of candidate sub-part blocks correspond to first k hypothetical positions with largest boundary matching costs among N hypothetical positions of the set of candidate sub-part blocks, and wherein k and N are positive integers with N greater than k.

12. The method of claim 11, wherein an index is parsed from the bitstream, and wherein the index indicates the SBT position among the first k hypothetical positions.

13. A method of video encoding, the method comprising:
- receiving pixel data associated with a current block to be encoded at an encoder side, wherein the current block is coded using an SBT (Subblock Transform) mode;
- deriving residual data for the current block by applying inter prediction to the current block;
- deriving an SBT position among a set of candidate sub-part blocks for the current block, wherein the SBT position is determined implicitly without signalling the SBT position in a bitstream or the SBT position is selected from a partial set of candidate sub-part blocks derived implicitly from the set of candidate sub-part blocks, wherein the SBT position is determined according to boundary matching cost derived from one or more neighbouring samples of the current block and one or more corresponding boundary samples of the current block for the set of candidate sub-part blocks; and applying SBT, by using SBT information comprising the SBT position, to the residual data for the current block to generate transformed residual data for the current block.

* * * * *